United States Patent [19]
Burnett

[11] Patent Number: 5,708,835
[45] Date of Patent: Jan. 13, 1998

[54] DUAL-DIRECTIONAL PARALLEL PROCESSOR

[75] Inventor: Robert W. Burnett, Torrance, Calif.

[73] Assignee: Hughes Electronics, Los Angeles, Calif.

[21] Appl. No.: 411,114

[22] Filed: Mar. 27, 1995

[51] Int. Cl.[6] ............................................. G06F 13/00
[52] U.S. Cl. ................... 395/800; 364/231.9; 364/232.9; 364/260; 364/DIG. 1
[58] Field of Search .......................... 395/200.08, 200.13, 395/200.15, 828, 834, 835, 840, 851, 858, 880, 311, 800; 364/131–134

[56] References Cited

U.S. PATENT DOCUMENTS

| | | | |
|---|---|---|---|
| 4,974,146 | 11/1990 | Works et al. | 395/800 |
| 5,138,704 | 8/1992 | Takahashi | 395/800 |
| 5,165,023 | 11/1992 | Gifford | 395/311 |
| 5,305,462 | 4/1994 | Grondalski | 395/800 |
| 5,535,410 | 7/1996 | Watanabe et al. | 395/800 |
| 5,586,279 | 12/1996 | Pordo et al. | 395/403 |

*Primary Examiner*—Alpesh M. Shah
*Attorney, Agent, or Firm*—Leonard A. Alkov; Wanda K. Denson-Low

[57] ABSTRACT

A dual-directional parallel processor. The inventive processor (10) includes an array (20) of processing elements (30). Each processing element has a first circuit (31) for inputting and outputting data, a second circuit (32) for inputting and outputting data; and a third circuit (33, 34) for setting the first circuit (31) in an input mode and for setting the second circuit (32) in an output mode in response to a first mode control signal. The third circuit (33, 34) also sets the first circuit (31) in an output mode and the second circuit (32) in an input mode in response to a second mode control signal. In the illustrative embodiment, data is communicated between the first and the second circuits (31, 32) and the processor further includes a fifth circuit (12) for inputting data to the array and a sixth circuit (14) for outputting data from the array. Each of the processing elements (30) is connected either between two other processing elements or between the fifth circuit (12) or the sixth circuit (14) and a neighboring processing element via the first or the second circuit (31 or 32) thereof.

9 Claims, 2 Drawing Sheets

DUAL-DIRECTIONAL PARALLEL PROCESSOR

BACKGROUND OF THE INVENTION

1. Field of the Invention

The present invention relates to electronic circuits. More specifically, the present invention relates to array processors and the like.

2. Description of the Related Art

Array processors are used widely to process large amounts of data with the same operation applied to different data sets. Array processors are conventionally two dimensional arrays of individual processing elements (PEs) connected in a parallel fashion. In the advantageous single instruction, multiple data (SIMD) processors, each processing element executes the same instruction at the same time. Each instruction is provided by an external source, such as an instruction sequencer, and is typically quite simple e.g., multiplication, addition, shifts, and etc.

In mesh connected parallel processing arrays, data flows through the array from the edges. In accordance with conventional teachings, data is input into the array from the north edge and flows south or data is input from the south edge and flows north. In any case, the results of a previous computational task can be extracted through the one edge at the same time it is input from a diametrically opposite edge. This allows for fewer I/O (input/output) connections than there are processing elements. Accordingly, input data must flow past other PEs to get to a particular processing element. Hence, to get data to an nth PE, 'n' clock cycles are required to move the data to the desired location.

While this approach is well suited for systolic operation (in which input data arrives at regular intervals at the first of several processing stages and output data is pumped out from the final stage), for cellular operation (i.e., load input, compute, unload results and load new input, compute, etc.), there are cases where higher input bandwidth is desired. For example, the utility of SIMD processors is currently limited with respect to certain applications such as the computation of Fast Fourier Transforms (FFTs). FFTs play an important role in radar systems, sonar systems and other applications. The problem with conventional SIMD processors is particularly acute in the computation of FFTs at high efficiency when the FFT size is so large that there is insufficient memory within the processing elements to store all of the data and coefficients. In this case, the coefficients have to be loaded into the processor array during the computation.

For these and other demanding applications, the slow propagation of data from a single edge is unacceptable. Accordingly, other approaches have been considered including direct connection to each PE and the addition of memory and data to each PE in advance of computation. However, none of these approaches have been found to be satisfactory. The wiring required for direct connection to individual PEs, for example, would be excessive. The addition of memory to the individual PEs and the preload of data into each would be impractical for those applications where the data is changing. Finally, an individual PE addressing scheme would require more complicated and therefore more costly PEs.

Hence, a need remains in the art for a system and/or technique for increasing data I/O rate in array processors.

SUMMARY OF THE INVENTION

The need in the art is addressed by the present invention which provides a dual-directional parallel processor. The inventive processor includes an array of processing elements. Each processing element has a first circuit for inputting and outputting data, a second circuit for inputting and outputting data; and a third circuit for setting the first circuit in an input mode and for setting the second circuit in an output mode in response to a first mode control signal. The third circuit also sets the first circuit in an output mode and the second circuit in an input mode in response to a second mode control signal.

In the illustrative embodiment, data is communicated between the first and the second circuits and the processor further includes a fifth circuit for inputting data to the array and a sixth circuit for outputting data from the array. Each of the processing elements is connected either between two other processing elements or between the filth circuit or the sixth circuit and a neighboring processing element via the first or the second circuit thereof.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
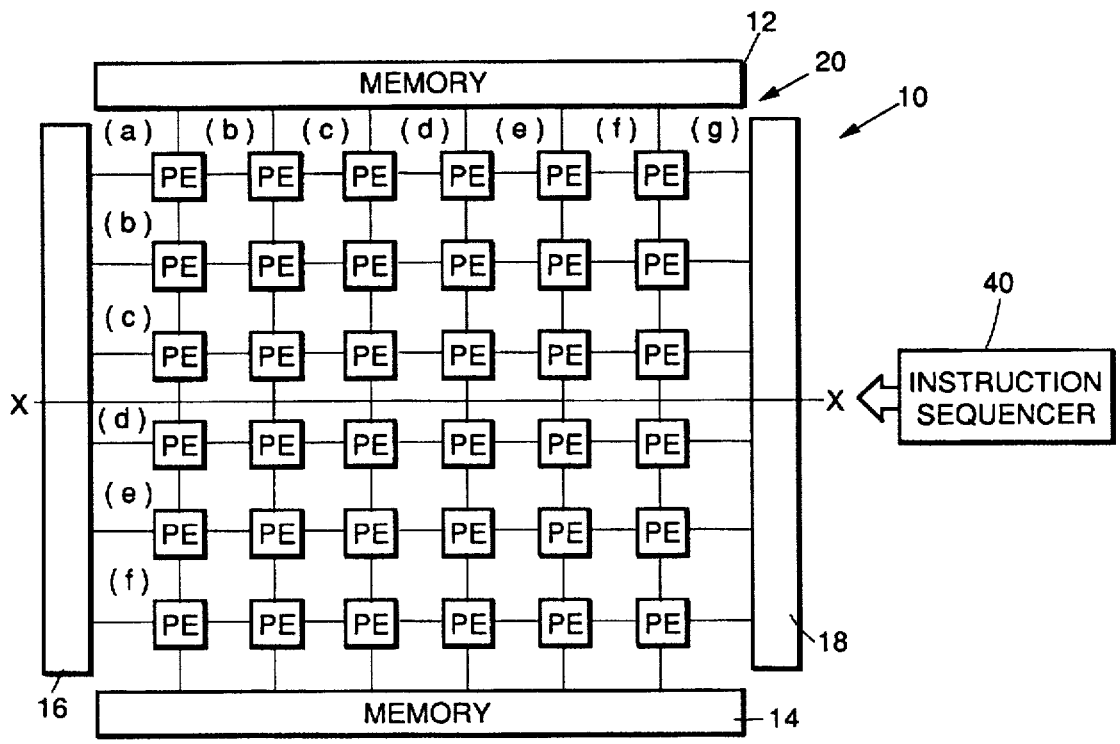
FIG. 1 is a simplified block diagram of the dual-directional array processor of the present invention.

FIG. 1 is a simplified block diagram of the dual-directional array processor of the present invention. The processor 10 includes first, second, third and fourth memories 12, 14, 16 and 18, respectively, disposed on the top, bottom, left and fight sides of an array 20 of processing elements (PEs). The array 20 is shown as a simple two-dimensional array of processing elements 30 with six rows (a–f) and six columns (g–l). (Those skilled in the art will appreciate that the dimensionality of the array and the number of processing elements therein may be changed without departing from the scope of the present teachings.) Hence, the first processing element in the first row and the first column is referred to as $PE_{a,g}$ and the element in the first row and the second column as $PE_{a,h}$, the element in the second row and first column as $PE_{b,g}$, and etc. Data is provided to and extracted from the array 20 via the memories 12–18 (even numbers only).

As discussed more fully below and in accordance with the present teachings, the PEs are designed to allow data to flow into the array in any direction from either of the four memories and to be removed from the array in any direction.

In a typical application, each PE receives an instruction from an instruction sequencer 40.

Figure 2:
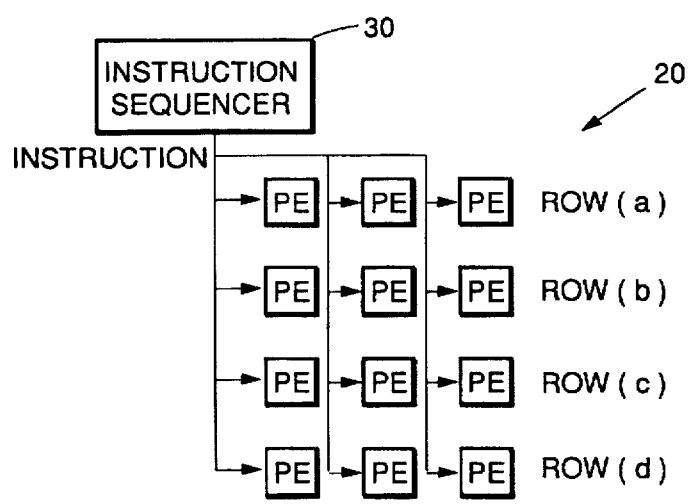
FIG. 2 is a simplified representation of the array showing the connections between the instruction sequencer and each individual processing element in the array.

FIG. 2 is a simplified representation of the array 20 showing the connections between the instruction sequencer 40 and each individual processing element in the array. In the embodiment of FIG. 2, each processing element receives the same instruction at the same time. Those skilled in the art will appreciate that an alternative instruction addressing scheme may be implemented by which each of the processing elements are addressed individually. In any event, the instruction sequencer 40 provides a command (mode control signal) to each PE which, when decoded and executed by the PE determines the direction of data flow through the PE and therefore through the array 20.

Figure 3:
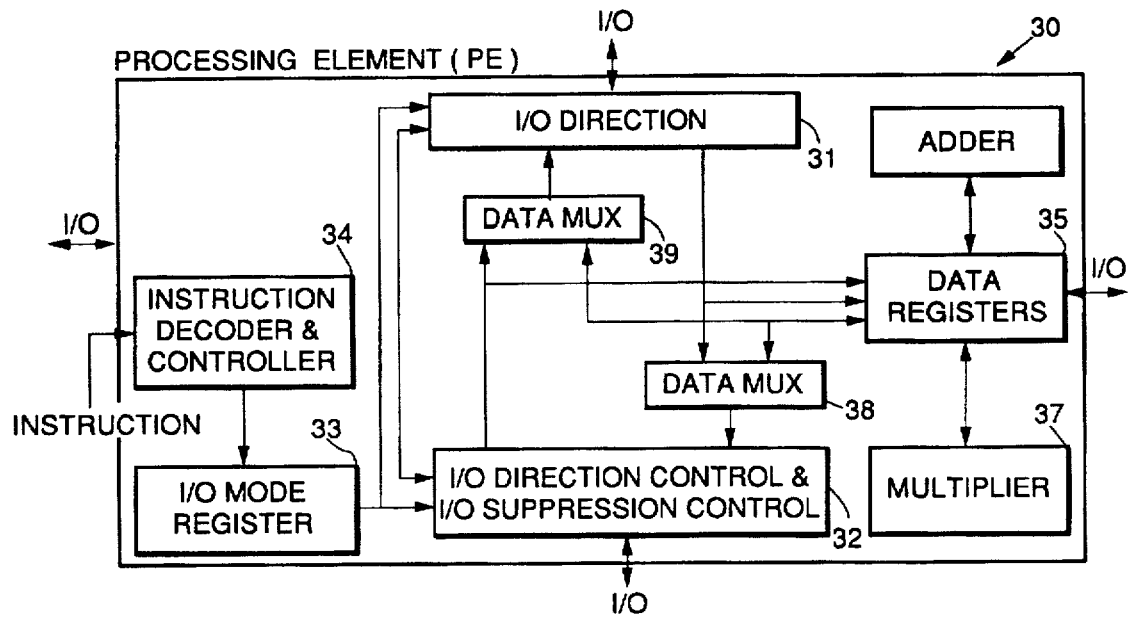
FIG. 3 is a simplified block diagram of a single processing element constructed in accordance with the teachings of the present invention.

FIG. 3 is a simplified block diagram of a single processing element 30 constructed in accordance with the teachings of the present invention. In the illustrative embodiment, each PE includes a set of input/output (I/O) direction control circuits 31 and 32 for the north-south axis of data flow through the array 20. The first I/O direction control circuit 31 communicates data to and from either a neighboring PE or a memory 12. The second I/O direction control circuit 32 also provides suppression control which inhibits the southward flow of data at the array midline when necessary to avoid conflicts by opposing line drivers. Not shown are an optional second set of identical I/O direction control circuits which control the flow of data to and from the PE along the east-west axis through the array.

Each of the direction control circuits may be implemented with combinational logic synthesized using VHDL (VHSIC Hardware Description Language) or other suitable circuit design methodology currently known and used in the art. For each direction of data flow, the operation of each of the processing elements will vary depending on the location of the PE relative to the midline of the array 20 shown as the line 'x—x' in FIG. 1 for north-south data flow through the array. (Not shown is a similar midline for the east-west direction of data flow.) Hence, rather than using the top memory 12 as a source and the bottom memory 14 as a destination for north-south data flow, both memories can be used in parallel as data sources. Mixed north-south or mixed east-west data flow is accomplished without having to execute a south flow instruction in the upper set of PEs and a north flow instruction in the lower set of PEs, for example. In accordance with the present teachings, this is achieved, instead, by including a one-bit I/O mode register 33 in each PE. When a PE's mode (or reversal) bit has a value of 1, for example, the effect is to reverse the I/O direction from the nominal direction specified in a north/south I/O instruction. To perform input through both the north edge and the south edge, the reversal bit is 1 in the upper set of PEs and 0 in the lower set of PEs, and "northward flow" instructions are issued to all PEs. Mixed direction output through both edges is performed with these same settings for the reversal bits, but "south flow" instructions are issued to the PEs. Ordinarily, the upper set of PEs referred to above will be all PEs in the top half of the array. However, it could include fewer or more rows, if asymmetric I/O partitioning is desired. Each column could be partitioned differently.

Two adjacent PEs cooperate in a data transfer between them, except at the midline separating north and south flow. When the resolved I/O direction of some $PE_{k,x}$ (of a particular column of the array) is south, and the I/O direction of its southern neighbor $PE_{k+1,x}$ is north, it is necessary to suppress one of the opposing I/O drivers. A technique for achieving this is to provide an interface line S from $PE_{k+1,x}$ to $PE_{k,x}$ that carries the current state of the reversal bit in $PE_{k+1,x}$. $PE_{k,x}$ suppresses its south-going I/O driver whenever the state of its reversal bit is different from that of its southern neighbor.

The data flow direction of the north memory 12 must also match the I/O direction at the northern edge of the processor array. Memory control logic associated with a PE column receives interface signal S from the northmost PE, conveying the state of that PE's reversal bit. This, along with the data flow direction specified in the instruction, allows the memory control logic to determine the required access direction for the north memory. The access direction for the memory at the south edge always agrees with the direction specified in the I/O instruction. Signal S received by a southmost PE is hardwired to 0, corresponding to no reversal of direction in the south memory.

The PEs are designed to implement the following exemplary function for a northward data flow instruction:
 a) if reversal bit is set:
  i) receive data from the north,
  ii) if the PE is just above the midline, then suppress south edge output, otherwise send data south;
 b) if reversal bit is not set, send data north and receive data from the south edge.

A midline register 44 (not shown) is incorporated into the I/O control circuit 32 of each PE. When this bit is in the set condition, it indicates that the PE is just above the midline. The manner in which this bit register is set is described below. An alternative method for determining whether a PE should suppress its south edge output is to incorporate the interface control line S between adjacent PEs as described above. The effect is the same for both methods, namely to prevent opposing line drivers from driving the same data line at the same time.

With respect to east-west flow, the same function could be incorporated with the exception that the north direction may be replaced with the east direction and the south direction may be replaced with the west direction by way of example.

The mode is provided to the register 33 by an instruction decoder and PE controller 34. The instruction decoder/controller 34 is a logic circuit which receives and decodes instructions from the instruction sequencer. The decoder/controller 34 may be designed using the VHDL or other suitable design methodology to implement the following function when it receives an I/O mode set instruction, where the instruction also specifies the midline row number M:

If PE row number is less than M (i.e., above the midline):
  Set I/O reversal bit (in mode register)
 If PE row number is greater than M:
  Clear I/O reversal bit
 If PE row number is equal to M:
  Set I/O reversal bit and set midline bit.

The instruction decoder/controller 34 is connected to a set of data registers 35, an adder 36 and a multiplier 37. These devices are used to execute an arithmetic processing instruction decoded by the decoder/controller 34. In a first mode of operation, data from the north flows through the first I/O direction control circuit 31 and through a first data multiplexer 38. (A second input is provided to the multiplexer 38 from the data registers 35 to output data created within the PE.) The output of the first multiplexer 38 is input to the second I/O direction control circuit 32. Thus, data may pass through or originate from the processing element 30. A second multiplexer 39 passes data arriving from the south via the second I/O control circuit 32 in the same manner. A similar arrangement of direction control circuits and multiplexers (not shown) are used to effect the flow of data along the east and west directions.

The use of a mode register to control reversal of the I/O direction in a subset of the PEs allows dual direction input (or output) to be accomplished without expanding the set of I/O instructions. Additional instructions can be created that are more descriptive of the actual dual direction I/O. These new instructions are a) "inward I/O" and b) "outward I/O". Each instruction is further qualified to specify either the north-south axis or the east-west axis. To exemplify the logic in greater detail, one implementation of a PE to provide the "inward I/O" instruction is shown in FIG. 4.

Figure 4:
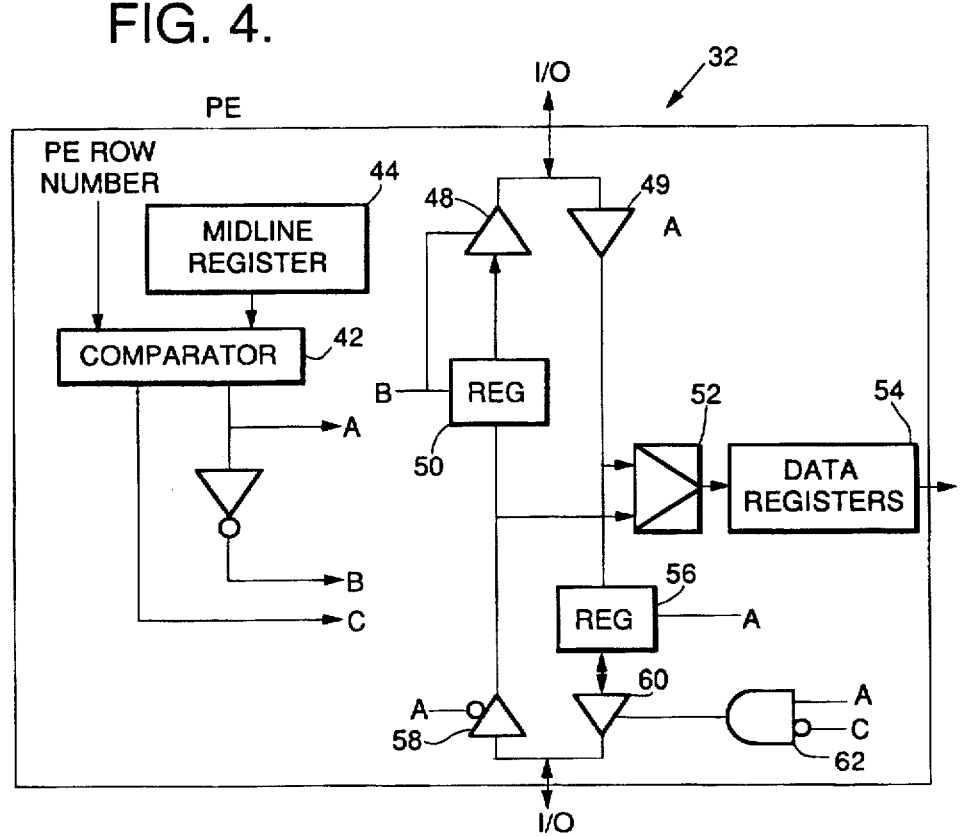
FIG. 4 is a more detailed diagram of the I/O elements of the processing element of FIG. 3 constructed in accordance with the teachings of the present invention.

FIG. 4 is a more detailed diagram of the I/O elements of the processing element of FIG. 3 constructed in accordance with the teachings of the present invention. The circuit 30 includes a comparator 42 and a midline register 44. The midline register 44 contains the midline row number M. For example, if there are 8 rows of PEs numbered 1 through 8, starting with 1 at the top, then M=4. The PE row number is hard wired via circuit board connections. Signal A is true (high) if the PE row number is above the midline row M. Signal B is true if the PE is below the midline row M. Signal C is true if the PE number is equal to the row number M.

Also included within the circuit 30 is a first buffer 48 and a second buffer 49 which provide for a transmission and receipt of data in the northward direction, respectively. The first and second buffers 48 and 49, along with a register 50 comprise the I/O circuit 31 of FIG. 3. Third and fourth buffers 58 and 60 perform the same function as the first and second buffers 48 and 49 in the southward direction. An AND gate 62 enables the fourth buffer 60 when the A signal is high and the C signal is low. The third and fourth buffers 58 and 60 along with a register 56 and the AND gate 62 comprise the I/O circuit 32 of FIG. 3. The first and second internal registers 50 and 56 store data transmitted from south to north and north to south, respectively, between the buffers 58 and 48 and 49 and 60 respectively. The outputs of the buffers 49 and 58 are input to a multiplexer 52 for storage in the data register 35.

After data from outside the processor array has traversed the desired number of PE rows, either downward from the north edge or upward from the south edge, it is captured in the data registers. Each successive "inward I/O" instruction is issued from the instruction sequencer and the subsequent capture of data in the data registers is commanded by a subsequent instruction.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A dual-directional parallel processor comprising:
   an array of processing elements, each processing element having:
   first means for inputting and outputting data, said first means including a first terminal, a first circuit for inputting data to said first terminal, and a second circuit for outputting data from said first terminal;
   second means for inputting and outputting data, said second means including a second terminal, a third circuit for inputting data to said second terminal and a fourth circuit for outputting data from said second terminal, an input of first circuit being connected to an output of said fourth circuit and an output of said second circuit being connected to an input to said third circuit; and
   third means for setting said first means in a first mode and for setting said second means in a second mode in response to a first mode control signal and for setting said first means in said second mode and for setting said second means in said first mode in response to a second mode control signal, whereby data is received by said processing element at said first terminal, communicated from said first terminal to said second terminal via said second circuit and said third circuit and output from said processing element by said second terminal in said first mode and received by said processing element at said second terminal, communicated from said second terminal to said first terminal via said fourth circuit and said first circuit and output from said processing element by said first terminal in said second mode.

2. The invention of claim 1 further including fourth means for communicating data between said first means and said second means.

3. The invention of claim 1 further including means for providing said mode control signals.

4. The invention of claim 3 wherein said means for providing said mode control signals is an instruction sequencer.

5. The invention of claim 4 further including means for decoding and executing instructions from said instruction sequencer.

6. The invention of claim 5 further including means for routing said mode control signals to said first means and said second means.

7. The invention of claim 1 wherein said processor further includes fifth means for inputting data to said array and sixth means for outputting data from said array.

8. The invention of claim 7 wherein each of said processing elements is connected either between two other processing elements or between said fifth means or said sixth means and a processing element via the first or the second means thereof.

9. A dual-directional parallel processor comprising:
   an array of processing elements, each processing element having:
   first means for inputting and outputting data, said first means including a first terminal, a first circuit for inputting data to said first terminal, and a second circuit for outputting data from said first terminal;
   second means for inputting and outputting data, said second means including a second terminal, a third circuit for inputting data to said second terminal and a fourth circuit for outputting data from said second terminal, an input of first circuit being connected to an output of said fourth circuit and an output of said second circuit being connected to an input to said third circuit;
   third means for setting said first means in an input mode and for setting said second means in an output mode in response to a first mode control signal and for setting said first means in an output mode and for setting said second means in an input mode is response to a second mode control signal, whereby data is received by said processing element at said first terminal, communicated from said first terminal to said second terminal via said second circuit and said third circuit and output from said processing element by said second terminal in said first mode and received by said processing element at said second terminal, communicated from said second terminal to said first terminal via said fourth circuit and said first circuit and output from said processing element by said first terminal in said second mode and fourth means for communicating data between said first means and said second means; and fifth means for inputting data to said array and sixth means for outputting data from said array, wherein each of said processing elements is connected either between two other processing elements or between said fifth means or said sixth means and a processing element via the first or the second means thereof.

* * * * *